(12) United States Patent
Ferrell

(10) Patent No.: US 10,230,643 B2
(45) Date of Patent: Mar. 12, 2019

(54) FULL FLOW RETRIEVAL OPTIMIZED PACKET CAPTURE

(71) Applicant: Los Alamos National Security, LLC, Los Alamos, NM (US)

(72) Inventor: Paul Ferrell, Los Alamos, NM (US)

(*) Notice: Subject to any disclaimer, the term of this patent is extended or adjusted under 35 U.S.C. 154(b) by 129 days.

(21) Appl. No.: 15/139,484

(22) Filed: Apr. 27, 2016

(65) Prior Publication Data
US 2017/0063695 A1    Mar. 2, 2017

Related U.S. Application Data

(60) Provisional application No. 62/165,733, filed on May 22, 2015.

(51) Int. Cl.
| | | |
|---|---|---|
| H04L 12/28 | (2006.01) | |
| H04L 12/819 | (2013.01) | |
| H04L 12/861 | (2013.01) | |

(52) U.S. Cl.
CPC .......... *H04L 47/21* (2013.01); *H04L 49/9084* (2013.01)

(58) Field of Classification Search
CPC ...... H04L 47/21; H04L 49/9084; H04L 12/00
See application file for complete search history.

(56) References Cited

U.S. PATENT DOCUMENTS

| | | | | |
|---|---|---|---|---|
| 7,633,944 B1 * | 12/2009 | Chang | ................... | H04L 43/028 370/389 |
| 8,472,449 B2 * | 6/2013 | Nevil | ...................... | H04L 12/56 370/395.1 |
| 9,473,373 B2 * | 10/2016 | Henry | ................... | H04L 43/0876 |
| 2003/0043802 A1 * | 3/2003 | Yazaki | ..................... | H04L 29/06 370/389 |
| 2004/0068614 A1 * | 4/2004 | Rosenbluth | ......... | G06F 13/1642 711/133 |
| 2010/0260204 A1 * | 10/2010 | Pepper | .................. | H04L 43/106 370/474 |
| 2011/0216774 A1 * | 9/2011 | Nevil | ...................... | H04L 12/56 370/395.7 |
| 2013/0266014 A1 * | 10/2013 | Blomquist | .......... | H04L 45/7453 370/392 |
| 2013/0346719 A1 * | 12/2013 | Tomlinson | .............. | G06F 12/10 711/165 |

OTHER PUBLICATIONS

Masahisa Tamura et al., "Distributed Object Storage toward Storage and Usage of Packet Data in a High-speed Network", published by the IEICE—Asia-Pacific Network Operation and Management Symposium (APNOMS) in 2014.

* cited by examiner

*Primary Examiner* — Lan-Huong Truong
(74) *Attorney, Agent, or Firm* — LeonardPatel PC

(57) ABSTRACT

A packet capture system may copy packets from an interface to a bucket. When the bucket is full of packets, a new bucket for incoming packets may be started, and the full bucket may be indexed. During the indexing, each packet may be sorted in the bucket by flow, and each flow may be indexed. Once indexing is complete, the packets are written to a flow ordered FCAP file and the indexes are written to disk. The flow ordered nature of the FCAP file combined with the indices and their associated search algorithms allow for rapid retrieval of captured flows.

18 Claims, 14 Drawing Sheets

| FCAP Header |
|---|
| Packet (Flow 1, Timestamp 8) |
| Packet (Flow 2, Timestamp 3) |
| Packet (Flow 2, Timestamp 5) |
| Packet (Flow 2, Timestamp 7) |
| Packet (Flow 3, Timestamp 1) |
| Packet (Flow 3, Timestamp 2) |
| Packet (Flow 3, Timestamp 4) |
| Packet (Flow 3, Timestamp 6) |
| ... |

| FCAP Header |
| --- |
| Packet (Flow 1, Timestamp 8) |
| Packet (Flow 2, Timestamp 3) |
| Packet (Flow 2, Timestamp 5) |
| Packet (Flow 2, Timestamp 7) |
| Packet (Flow 3, Timestamp 1) |
| Packet (Flow 3, Timestamp 2) |
| Packet (Flow 3, Timestamp 4) |
| Packet (Flow 3, Timestamp 6) |
| ... |

400

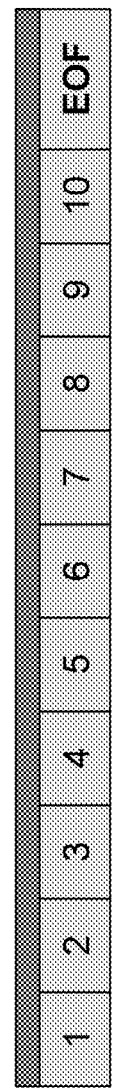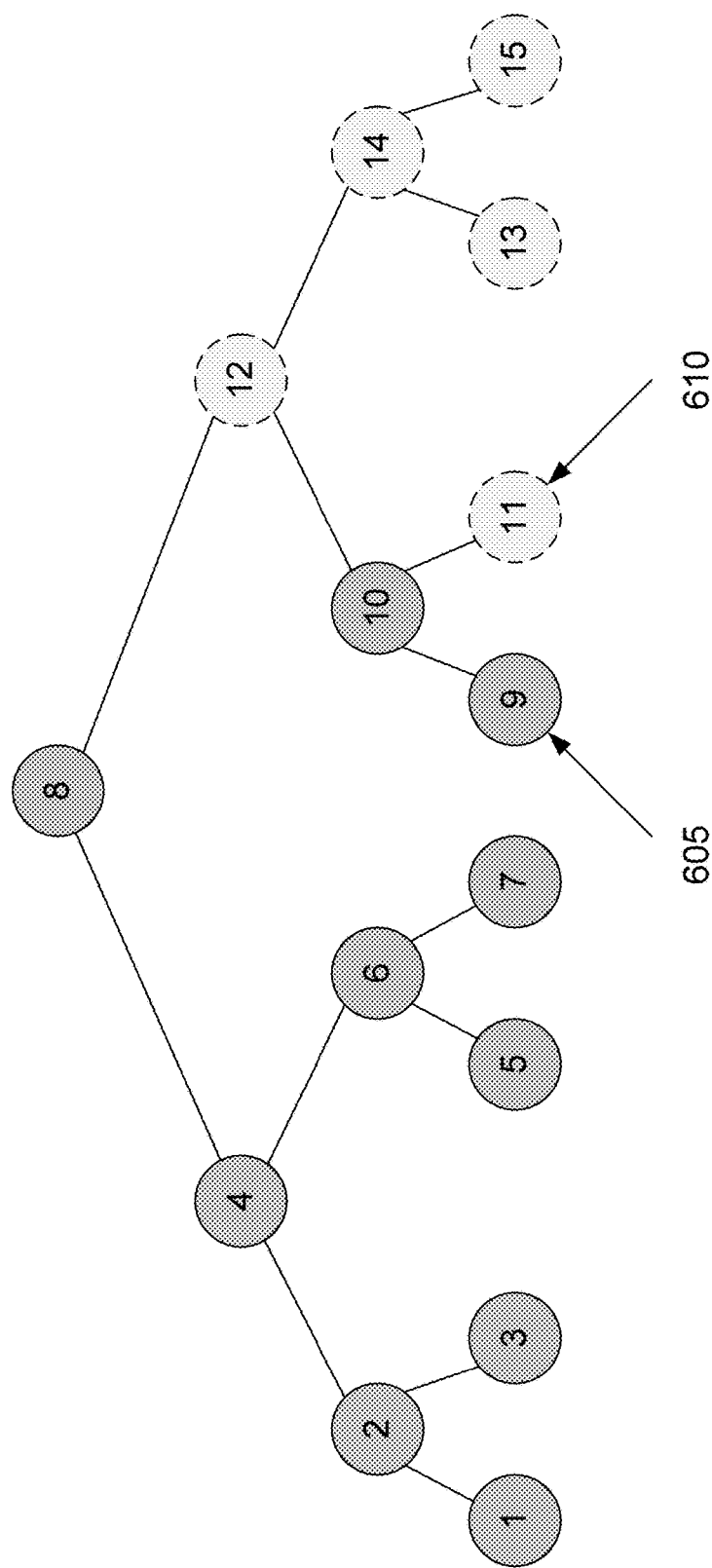
Fig. 6

700

800

1200

FULL FLOW RETRIEVAL OPTIMIZED PACKET CAPTURE

CROSS REFERENCE TO RELATED APPLICATION

This application claims the benefit of U.S. Provisional Application Ser. No. 62/165,733, filed on May 22, 2015. The subject matter of this earlier filed provisional patent application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention relates to capturing packets, and more particularly, capturing packets in a manner that pre-optimizes the stored results for rapid retrieval by network flow.

BACKGROUND

The ability to capture, archive, search, and retrieve network traffic is essential to cybersecurity investigative processes. Unfortunately, existing capture processes have not scaled as readily as network speeds. The difficulty is not in the initial capture and archival steps, but in searching and retrieving packets from the massive amount of captured data. Various solutions have tried to alleviate this problem with various indexing methods, but the end result is still an inefficient and tedious process given the storage medium.

FIG. 1, for example, is a flow diagram 100 illustrating a conventional process for capturing packets. In this process, packets are retrieved from an interface at 105, and stored in memory at 110. Although potentially optional, indexes are built identifying what traffic has occurred at 115. These packets and indexes are then written to a disk at 120. In the conventional packet capture process, the packets must be retrieved from the interface and processed fast enough to prevent the kernel or interface from dropping the packets. While this process has relatively low intensity with respect to the central processing unit (the "CPU") and memory, the sustained disk writes, combined with random access reads from search and retrieval, place a significant strain on the system disk input/output (the "I/O").

Thus, an alternative approach for capturing packets may be beneficial.

SUMMARY

Certain embodiments of the present invention may provide solutions to the problems and needs in the art that have not yet been fully identified, appreciated, or solved by current pack capture approaches. For example, some embodiments pertain to organizing packet data by network flows. Flows may be written to disk such that their packets are in a known, contiguous area, greatly reducing the amount of disk I/O needed to retrieve them. As part of the flow organization process, indexes may be generated into these flow captures, allowing a user to quickly locate and retrieve any given flow. These indexes also allow the user to quickly find the relevant flows for any given search. The organization of the indexes and packets also allows for quick recombination of the data across both files and multiple capture nodes.

In an embodiment, a computer-implemented process may include copying a packet from an interface to a bucket. The process may also include indexing the bucket comprising a plurality of packets when the bucket is full. The process may further include writing each of the plurality of packets to memory.

In another embodiment, a computer-implemented process may include copying packets from an interface to a bucket. The process may include starting a new bucket for incoming packets, and indexing the full bucket by sorting each packet by flow, when the bucket is full of packets. The process may further include writing the packets to a flow ordered FCAP file. The process may also include writing indexes of the flow order FCAP file to memory.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 illustrates a packet organization in a flow capture (FCAP) file, according to an embodiment of the present invention.

FIG. 6 illustrates an index tree, according to an embodiment of the present invention.

DETAILED DESCRIPTION OF THE EMBODIMENTS

Embodiments of the present invention generally pertain to packet capture using a network flow. A network flow may include a set of packets with certain 5-tuples of the source Internet Protocol (IP), destination IP, source port, destination port, and transport . It should be appreciated that in some embodiments, the flows are not constrained by time, but viewed within a certain timeframe. With this in mind, the flows are assumed to be in communication between specific applications on specific hosts.

When, for example, a user performs a search and retrieves captured packets, the desired result is either a summary of flows or the data in those flows themselves. In some embodiments, the data is viewed in terms of flow from beginning to end, and not just in the interface.

In some embodiments, flow captures are essentially a reorganization of the captured packets by flow instead of time. Given the flow start offset within a file, the flows may be retrieved with significantly less wasted I/O than retrieving the individual packets themselves. Furthermore, less I/O is wasted than when scanning the entire file. Indexing these files by flow provides the offsets. Since the indexes are of flows rather than individual packets, the indexes of flows are typically around one tenth the size and are much faster to read.

Also, in some embodiments, flow organized captures enable a variety of optimizations that greatly reduce I/O requirements when searching, reduce the algorithmic time complexity involved when searching, and provide a system better suited for archiving and data recovery than conventional systems.

Capturing Flows

The final output of the packet capture system is a time-delimited series of FCAP files and indexes into those files. These captured files mostly adhere to the packet capture (PCAP) file format, except that the packets are ordered by the flow. See, for example, FIG. 2, which illustrates packet organization in a FCAP file 200, according to an embodiment of the present invention. In other words, in FIG. 2, the numbering of the flows and timestamps represent their relative ordering. Also, in FIG. 2, flows are ordered by 5-tuples, and the packets within each flow are in original time order, i.e., timestamp. This allows for addressing and retrieving flows from each file as described above.

Figure 1:
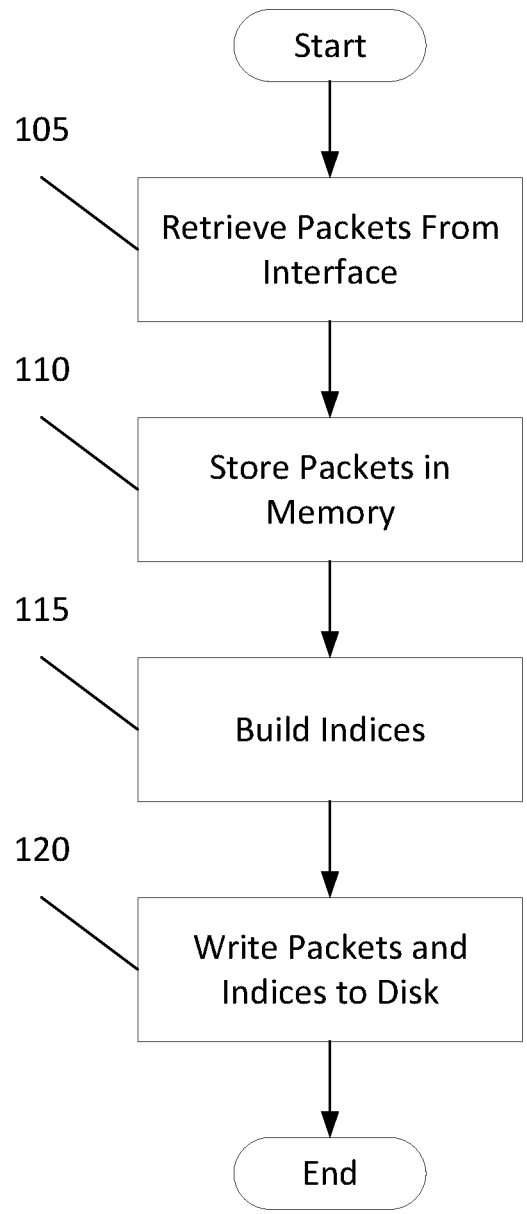
FIG. 1 is a flow diagram illustrating a conventional process for capturing packets.

Since these captured files are ordered by flow, there is no need to write packets to the disk as the packets are received. For example, in the conventional packet capturing process of FIG. 1, the first packet in the file may be the last packet received, and therefore, the true ordering of the packets may not be known until all of the packets for an FCAP file are captured and processed.

The packet data in each FCAP file may be stored in memory in a bucket data structure. Each bucket (and capture file) may have a size limit of 4 GB in some embodiments. It should be appreciated that the size limit may vary depending on the configuration of the system. For example, using the size limit of 4 GB for a bucket, when the bucket is filled with packets, the bucket is closed and indexing of the flow begins. A new bucket is also started, and the capture process continues.

Figure 3:
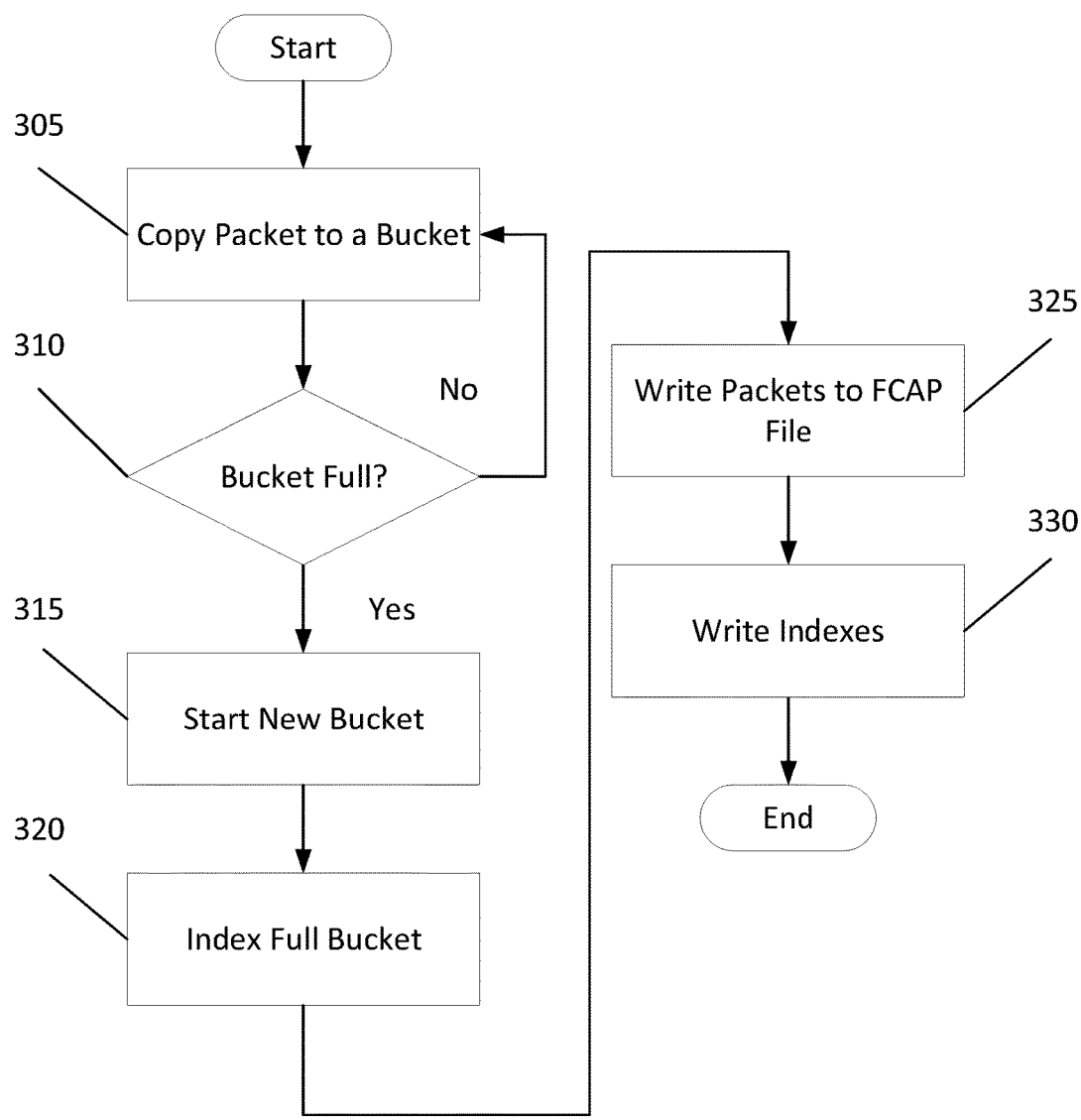
FIG. 3 is a flow diagram illustrating a process for capturing flows, according to an embodiment of the present invention.

FIG. 3 is a flow diagram 300 illustrating a process for capturing flows, according to an embodiment of the present invention. In some embodiments, the process begins at 305 with copying a packet from an interface to a bucket. At 310, it is determined whether the bucket is full of packets, and if not, the process returns to 305 and the next packet is copied from interface. Otherwise, at 315, when the bucket is full of packets, a new bucket for incoming packets is started, and at 320, the full bucket is indexed. During the indexing, each packet may be sorted in the bucket by flow (5-tuple), and each flow may be sub-indexed by individual components of the 5-tuple, such as the source IP address.

Once indexing is complete, the packets are written to a FCAP file at 325. The packets may be written based on the sort order determined during the indexing process. At 330, the indexes are written to disk.

Parallelization

Because packets are gathered into complete buckets, the capture process may be parallelized. Indexing by network or transport layer properties may be accomplished without sharing information from bucket to bucket. Assuming that the contents of the bucket are not tied to the content of other buckets, the processing of the buckets may be performed in parallel. Similarly, writing the buckets to disk may only require the results of the indexing step and the knowledge of where the buckets should be written.

In some embodiments, each part of the process may be performed simultaneously for different buckets. This way, packets can be captured from multiple interfaces with multiple capture threads. Multiple indexing threads may allow the indexing system to easily catch up after traffic bursts. This way, the available disk I/O with multiple output threads will be thoroughly utilized.

It should be noted, however, that an indexing application layer information may require information related to one packet in a bucket to be shared with another packet in another bucket. For instance, if a user wishes to index HTTP artifacts by file name, and if file name header information in the flow were to be split on a packet boundary and the next packet was in a different bucket, then the user must either find a way to share that information or opt to lose it. Since the buckets are being processed in parallel in some embodiments, it is highly likely that the continuation packets, early in a bucket, are processed before their predecessors at the end of the prior bucket. In certain embodiments, the buckets may be processed in order. However, certain embodiments, the application layer information may be transmitted to yet another thread that can generate these indexes separately.

Indexing

It should be appreciated that in some embodiments, indexing threads take a full bucket, and sort the packets in that bucket into flows. In the output step, the flows are in a sorted order, and the packets are written to disk to create an FCAP file. The sorted arrangement of flows may also serve as the basis for the master flow index, e.g., a 5-tuple sorted list of the flows, as well as, and the offset into the FCAP file where the flow packets can be found. This may also include, for example, summary attributes such as start and end timestamps and flow size in bytes and packet count.

In addition to creating an index of 5-tuple information, a series of sub-indexes are created on four of the 5-tuple attributes for each flow (IP addresses, ports) in some embodiments that reference the position of each matching flow in the flow index. These sub-indexes allow for significantly faster selection of a subset of the flow index.

Algorithms for Indexing

When sorting packets into flows, packets within an active flow tend to occur in groups as transmissions on that channel are started, and the data may be transferred as fast as possible. Similarly, when indexing the source IP addresses of a new flow, the fact that an IP occurs implies that the host is active, and thus, the host is much more likely to produce additional flows relatively soon.

Selecting an algorithm to generate a sorted index involves consideration of the above properties of the data, as well as a few other considerations. For example, memory usage should be minimized, i.e., each byte used in the data structures for sorting would result in approximately 2 MB of memory when indexing packets into sessions and 90 KB when indexing sessions by sub-properties. Also, in another example, each index is created once, is never searched, and items are never deleted. Only insertion time matters. In another example, the data structure should be processed in least to greatest order to write the index to disk.

After a survey of potential algorithms, Splay Trees are used in some embodiments due to their ability to take advantage of unique properties of data. Splay Trees are a form of a binary search tree that are altered after each search or insert to move the searched or inserted item to the root of the tree. This places those items that have most recently occurred at the top of the tree, where they can be accessed with minimal effort. In practice, with packet data, searches and insertions into the Splay Tree may require searching to a depth of, for example, $$\frac{\log_2 n}{2}.$$

A completely balanced binary tree, in contrast, may have an expected depth of search of a little less than $\log_2 n$, as half the entries are in the bottom layer.

Figure 4:
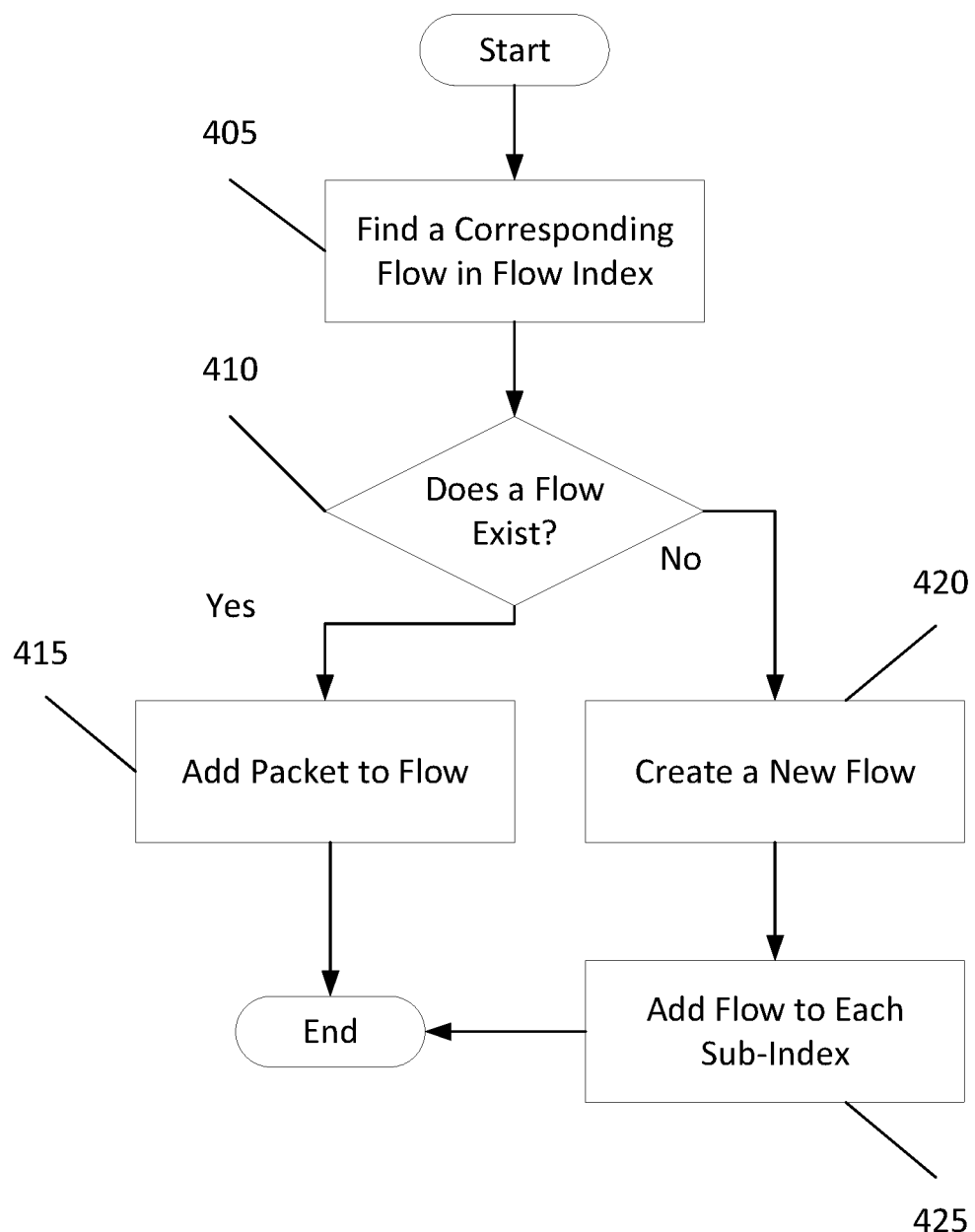
FIG. 4 is a flow diagram illustrating a process for indexing a packet, according to an embodiment of the present invention.

FIG. 4 is a flow diagram 400 illustrating a process for indexing a packet, according to an embodiment of the present invention. In this embodiment, the process begins at 405 with searching for a corresponding flow in a flow index for each packet in the bucket. At 410, it is determined whether a flow exists, and if a flow does exist, a packet is added to the flow at 415. If a flow does not exist, then at 420 a new flow is created, and at 425, a flow is added to each sub-index.

Creating FCAP

Figure 5:
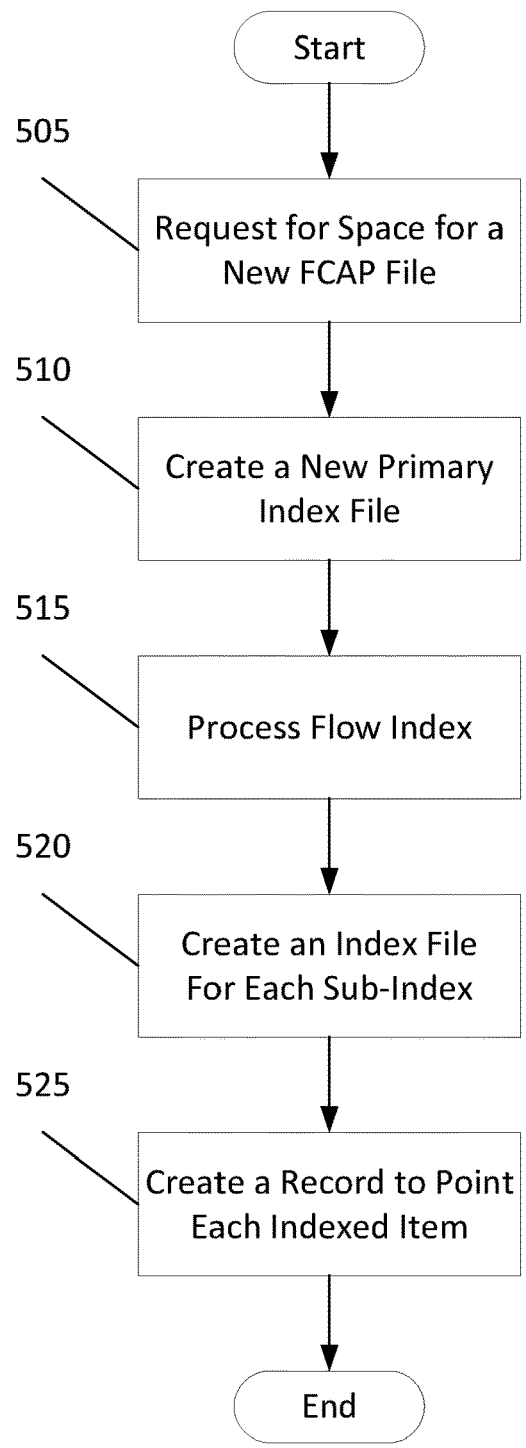
FIG. 5 is a flow diagram illustrating a process for creating a FCAP file, according to an embodiments of the present invention.

Once a bucket is sorted by flow, the packets can be written to disk in FCAP order along with their indexes. FIG. 5, for example, is a flow diagram 500 illustrating a process for creating a FCAP file, according to an embodiments of the present invention. The process begins at 505 with requesting for the system to create space for a new FCAP file, and at 510, a new primary index file is created.

At 515, the flow index is then recorded to disk. This step may include recording the FCAP file offset for the first packet in the flow. This may also include creating a primary index record for the flow, which references the FCAP file offset for the flow. The offset of the flow index record may be noted for use by sub-indexes. Also, this step may also include writing each of the packets in the flow to the FCAP file with a PCAP compatible packet header.

At 520, an index file for each sub-index is created, and at 525, each sub-index is processed in order. This also includes creating a record to point each indexed item to the flow record in the primary index.

It should be appreciated that the FCAP files described herein have a different sort order than the standard PCAP. It should be further appreciated that additional differences exist between FCAP files of certain embodiments and the standard PCAP. For example, by setting a hard limit on the size of the FCAP files, the FCAP files can be preallocated in advance by utilizing, for example, the preallocated system call. Similar to the buckets, these preallocated files can be recycled without the need to free and allocate them again.

For normal PCAP files, the last packet is read when the end of the file is reached. For preallocated files, there may be space left over between the last packet and the end of the file. To account for this, the otherwise unused PCAP file header attribute to write the total number of packets in the file is reused in some embodiments.

Indexing within the packet capture system described herein with respect to some embodiments may be done with several goals in mind. First, the indexes should be optimized for search speed. The distributed nature of the FCAP files and their indexes means that for any given search, hundreds of individual indexes may be searched separately. Performing these "micro-searches" should occur as quickly as possible to preserve the user experience.

Secondly, index storage requirements should be minimized. For example, for standard 4 GB capture files, each byte used to index each flow results in $$1\frac{\text{byte}}{\text{flow}} * 90000 \frac{\text{flow}}{FCAP} * \left(2 * 60 * 24 \frac{FCAPs}{\text{day}}\right) = 247 \frac{MB}{\text{day}}.$$

In other words, the less space that is needed for indexes, the more space that will be available for storing the actual capture data. Additionally, the amount of disk space accessed during a search should also be minimized.

It should be appreciated that the processes described herein for indexing produce a file having a key sorted sequence of fixed length key-value pairs. Such a sequence is essentially a presorted array. When viewed through certain addressing algorithm, such an array may be treated as a binary search tree without the need for additional pointers.

For an index with a 4 GB size, for example, searching and indexing for 90,000 flow records may require $\log_2$ 90,000=16.5 disk reads to traverse a leaf node. Near the top of the tree, each of these reads may be a separate, slow seek operation. As the reads near the bottom of the tree, the reads are more likely to be in the same disk block.

To reduce the number of seeks to traverse this index, the first block of the file may include both the file header and a preview-tree of the keys from the top N levels of the tree. N varies according to size in some embodiments. For example, for IPv4 address keys (4 bytes) and 4 KB blocks, N equals 10, and for IPv6 address keys, N equals 8, effectively halving the number of block reads required. The number of seeks required to read the top portion of the index in this embodiment may be reduced by N.

This leaves, at worst (IPv6), a depth nine sub-tree to search at the bottom of the index. For IPv6, such a subtree is only 10 KB in size, or 3-4 disk blocks. It can be read, buffered, and searched all at once. Assuming those blocks are contiguous, the total disk seeks to find an item may be reduced in the index to two.

Given a sorted list of key-value pairs, there are many possible tree traversal algorithms that may produce trees of height no more than $\log_2$ n. The differences between these algorithms are how they calculate the tree root and the position of the left and right children of a node. While the tree may be searched equivalently regardless of the algorithm, generating the tree and a useful preview index encourages certain algorithms over others.

In certain embodiments, the tree algorithm greatly simplifies many of the calculations. The root of the tree, and each of its subtrees, is determined as if the tree were a full, balanced tree of the minimum height required to hold all of the nodes. The nodes used to fill out the rest of the tree may be imaginary, each with a value greater than the largest key, and thus, all the nodes may be positioned beyond the end of the list of real nodes. FIG. 6, for example, illustrates an index tree 600, according to an embodiment of the present invention. In FIG. 6, real nodes 605 may exist under imaginary nodes 610, but only to the left thereof.

For embodiments in which this tree addressing scheme is used, the sorted array of $n=2^d-1$ (where d is the tree depth) nodes as a node may be traversed in only one way. For example, the algorithm to select the root and left and right branches should be carried out such that each subtree is also full and balanced. This makes the only choice for the root $r_i=2^{d-1}+1$, or one position beyond the size of a full left subtree. For any node $k_d$ that is less than or equal to d, the left and right subtrees are similarly rooted at $k+(2^d-k_d)$. To calculate the depth of a node given just its array index k (needed when generating preview indexes), the relationship $k_d=i=k \mod 2^{d-i}=1$ is provided.

Searching

Prior packet capture systems have focused on moving network data from the interface to disk provided that the users remain a secondary consideration. In some embodiments, the packet capture system balances both needs, ensuring that a complete capture optimized for searching is realized.

Supported Searches

Traditionally, with PCAP data, essentially all of the searches involve nothing more than searching 5-tuple information within a given time window. In some embodiments, the final objective when searching is to extract the relevant flows from the archived data. Being able to view intermediate results as a list of found flows is useful as well. This allows the packet capture system to quickly refine searches to only the flows that are needed.

In some embodiments, a user may enter search parameters combined with logical operators, such as AND, OR, and/or NOT, to find the relevant flows within a time window. Results are returned as a set of flows navigable by the user. The user may then refine his or her search or request the PCAP for those flows. For search parameters, the basic 5-tuple attributes are supported in some embodiments.

Parsing a user search may include a standard tokenization and parse tree generation process. The final parse tree may include a combination of logical operators and search atoms. Search atoms include a key type and key-value pair that will be used to perform a search on a particular sub-index for each relevant FCAP file. For example, a Source IP with the address 192.168.10.5 would result in searching the source IP sub-index for that IP for each FCAP file in the given timespan.

Search Normalization

Figure 7:
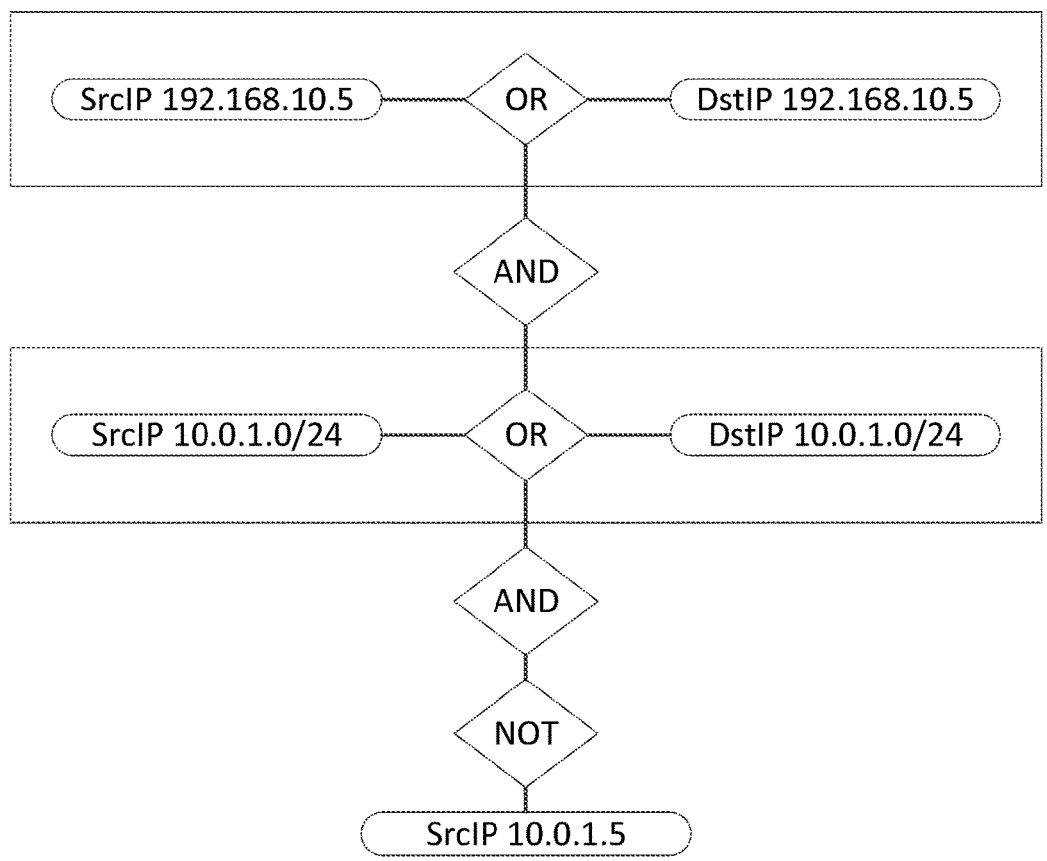
FIG. 7 illustrates a parsed search tree before normalization, according to an embodiment of the present invention.

Before the search system is searched, the search system is transformed into a normal form. This form provides both a standard means to communicate with the search and acts as good representation of how the search will be performed on the indexes for each FCAP file. An example search, before normalization, is shown in FIG. 7. For example, parsed search tree 700 in FIG. 7 is for the search 192.168.10.5 AND 10.0.1.0/24 AND NOT SrcIP 10.0.1.5.

Figure 8:
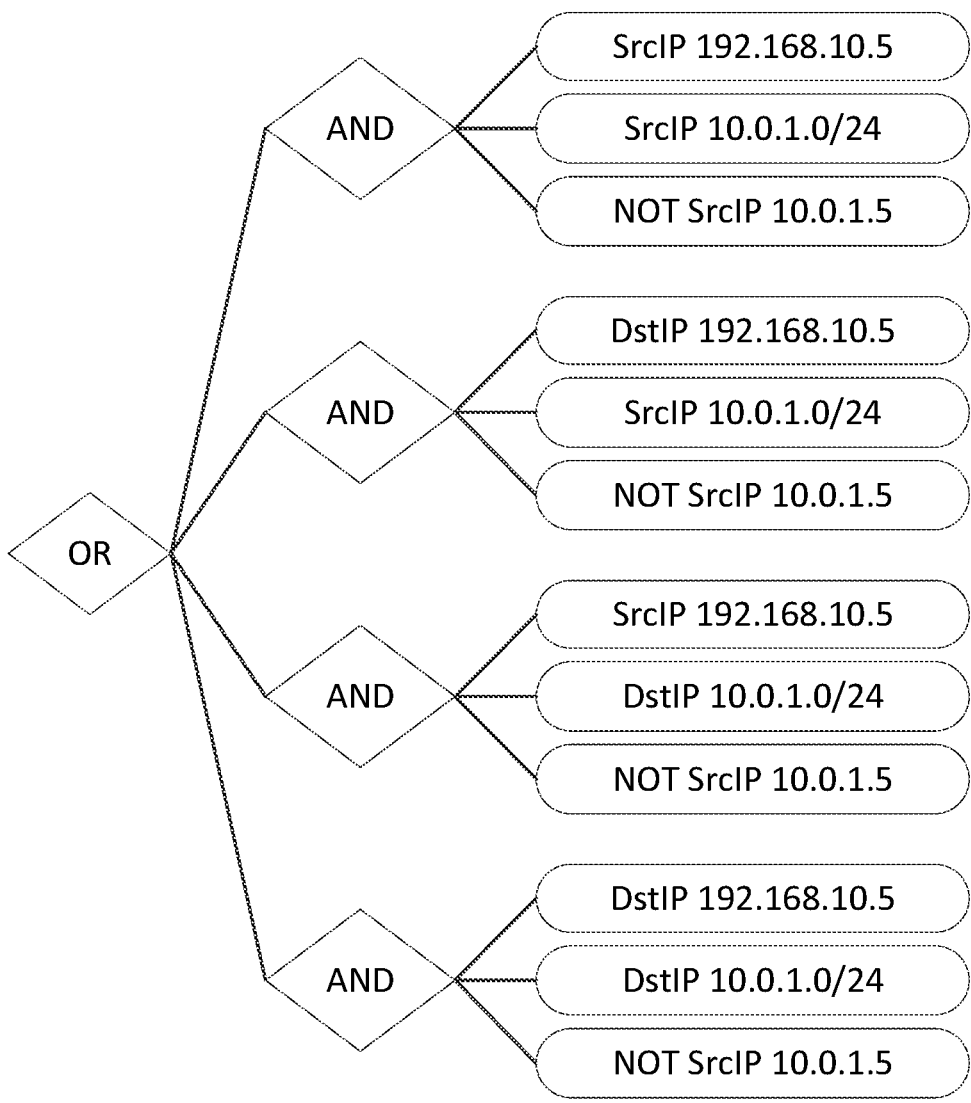
FIG. 8 illustrates a search tree after normalization, according to an embodiment of the present invention.

The normalized search tree in some embodiments has three distinct levels: a single OR as the root node, a second level having AND operations, and a final level have search atoms (leaf nodes). The search atoms of the final level may be inverted. The NOT operations in the parse tree are pushed down the tree and merged into the atoms themselves. Finally, the atoms in each AND group are sorted and duplicates are eliminated. FIG. 8, for example, shows a search tree 800 after normalization, according to an embodiment of the present invention.

Producing Search Results

Figure 9:
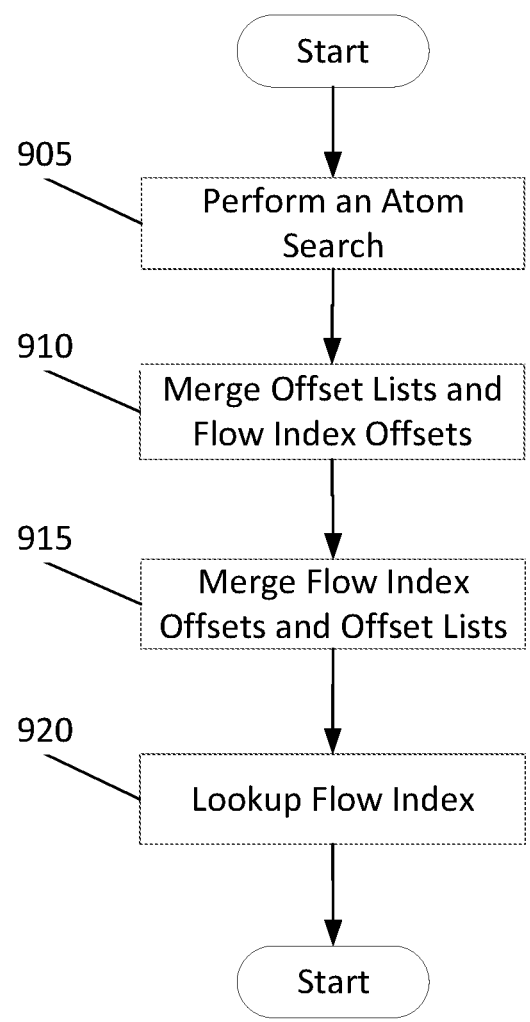
FIG. 9 is a flow diagram illustrating a process for combining sub-index results to fetch flow records, according to an embodiment of the present invention.

Given the normalized search tree from FIG. 8, generating the results of a search involves performing the atom searches, finding the intersection (AND) of those results for each AND group, finding the union (OR) of the AND group results, and then using these to retrieve the flow records from the flow index. This is shown in FIG. 9, which is a flow diagram 900 illustrating a process for combining sub-index results to fetch flow records, according to an embodiment of the present invention.

In some embodiments, the process begins at 905 with searching for an atom, i.e., finding a key in a sub-index. At 910, the offset lists from other atom searches are merged with a flow index offset from the atom search performed in 905 to produce flow index offsets. At 915, the flow index offsets and the offset list from other AND units are merged to produce flow index offsets. At 920, a lookup of the flow index is performed. In some embodiments, this may include fetching records according to offsets in the offset list and/or filtering the transport and the precise time range. This allows entries for the flow index to be produced in ordered 5-tuples.

It should be appreciated that the results of each step are cached to the disk in this process in some embodiments. This prevents any need to redo searches for search atoms duplicated in the normalization process. This also allows for more efficient searches when users make minor changes to search parameters.

The output of each step in this process is a sorted list of items that will be merged with other lists in the following step. The initial steps work with offsets into the flow index for a single FCAP file. Since the flow index is ordered by flow, the offsets and the list of flows that results are similarly ordered. By taking as input multiple sorted lists, and then producing a sorted list at each step, the time complexity of the algorithms is greatly reduced at each step.

Merging Atom Searches

Each of the ANDed units is essentially the intersection of the (pre-sorted) result sets of the atom searches. Performing this intersection operation on sorted stacks is relatively trivial. The fact that some of the stacks are NOTed does not significantly complicate the process.

Figure 10:
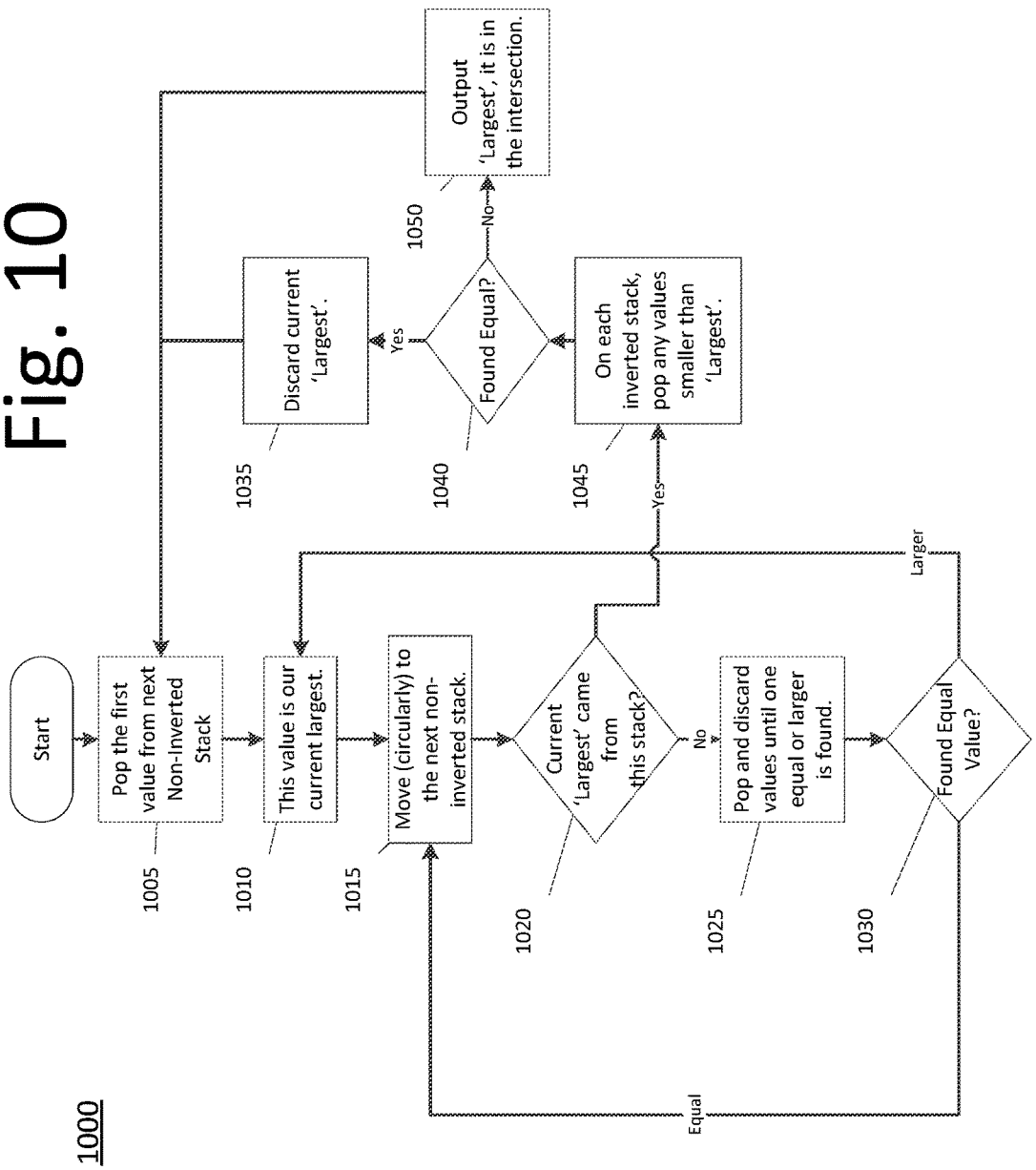
FIG. 10 is a flow diagram illustrating a process for merging atom searches, according to an embodiment of the present invention.

FIG. 10 is a flow diagram 1000 illustrating a process for finding the intersection of atom search results, according to an embodiment of the present invention. The result of each atom search is an ordered set (stack) of flow offset values. In some embodiments, the first value from a non-inverted stack is popped at 1005. After receiving this initial value (or first value in some embodiments), the initial value is called or labeled as the largest value, i.e., the largest value seen so far at 1010. The process at 1015 moves circularly to the next non-inverted stack, and at 1020, the process determines if the current largest value is from this next non-inverted stack. If not, then at 1025, the values from this next non-inverted stack is popped and discarded until an equal or larger value is found.

Once the equal or larger value is found, the process at 1030 determines if the value found is equal or larger. If, for example, the value found is equal, the process returns to step 1015. Otherwise, the process returns to step 1010 to make the larger value the current largest value. In other words, the top value of each stack is compared to that 'largest value' (see, for example, steps 1015, 1020, 1025, 1030).

Any smaller values are discarded, as the stack ordering implies that such values must be missing from at least one of the non-inverted stacks. If values larger than the current largest value is found, then the current largest value is discarded and the largest value is redefined, as the stack it came from must be missing the new 'largest value'. Finding a value equal to the 'largest value' in each non-inverted stack means this value may be in our intersection.

As discussed earlier, at step 1020, the process determines if the current largest value came from this next non-inverted stack. If so, then at 1035, the process pops on each stack any value that is smaller than the largest current value. At 1040, if any of the popped values are equal to the current largest value, then at 1045, the process discards the current largest value and returns to 1005. However, if any of the popped values are not equal, then at 1050, the process outputs the largest current value and returns to 1005.

In other words, each inverted stack is similarly checked for equal values, though in some embodiments finding an equal value will mean the 'current largest' value is disqualified from the intersection and the process starts over with a new 'largest value'. Values that are found in each of the non-inverted stacks and none of the inverted stacks must be in the intersection. See, for example, step 1050 of FIG. 10. Although not shown, any attempt to get an item from a non-inverted stack implies that all values in the intersection have been found and the process is complete.

In the above process, each value in each stack is examined once, making the value computationally O(n*i), where n is the number of items in all stacks, and i is the number of inverted stacks. Memory usage is O(1), as nothing more than a few tracking variables are needed.

One corner case in this process arises when all of the atom searches are inverted. In such a circumstance, the entire set of flows may be included to intersect the NOTs. The results of these searches would contain in certain embodiments a large percentage of the original flow records. These searches should be detected and prohibited before they are started.

Unions of Presorted Lists

Figure 11:
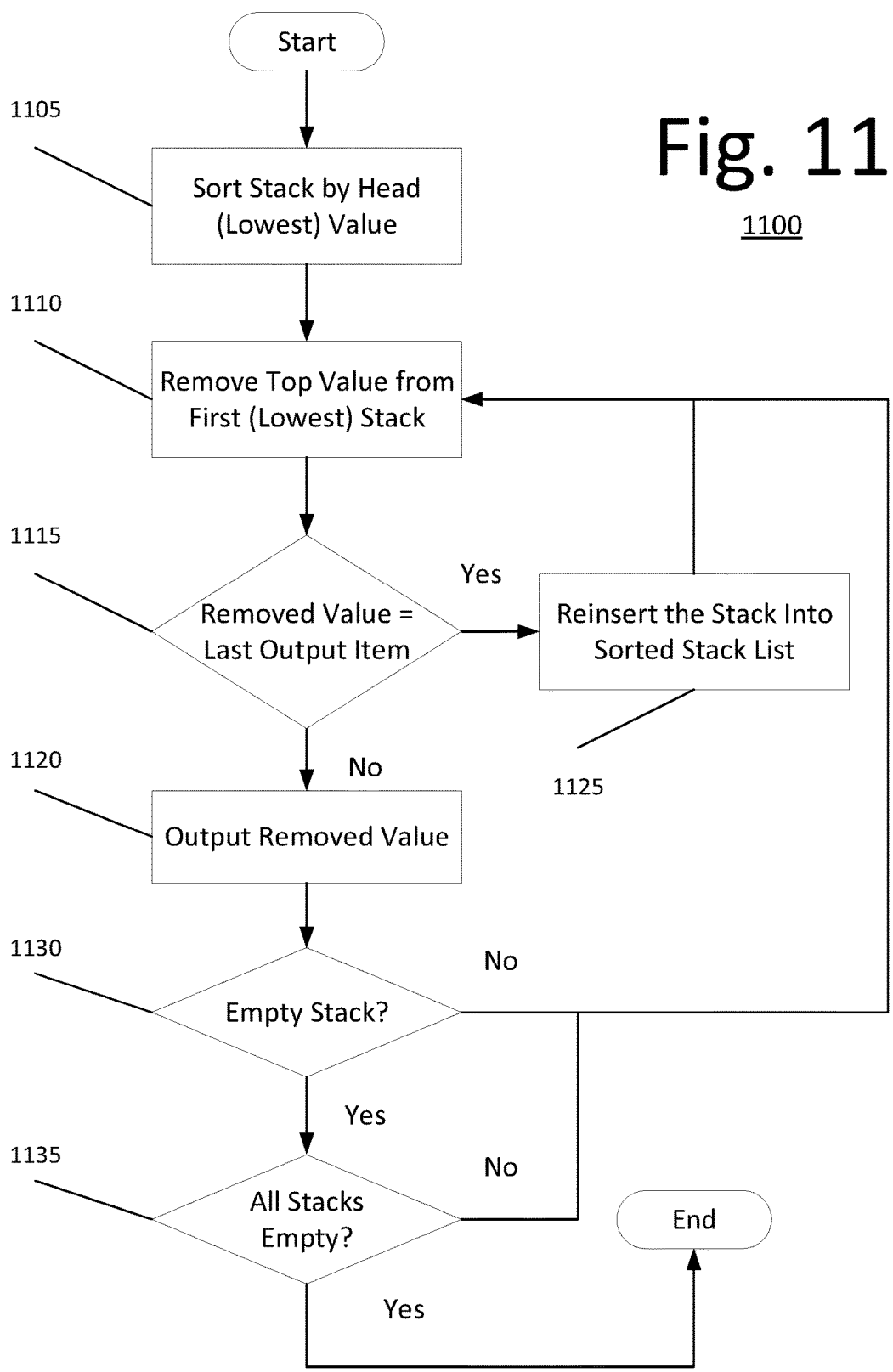
FIG. 11 is a flow diagram illustrating a process for taking a union of multiple sorted stack offsets, according to an embodiment of the present invention.

To take the union (OR) of multiple sorted stacks of offsets (or flow records), a similar process to FIG. 10 is carried out in some embodiments. See, for example, FIG. 11, which is a flow diagram 1100 illustrating a process for taking a union of multiple sorted stack offsets, according to an embodiment of the present invention. The process begins at 1105 with sorting the stacks by their head (lowest) value. At 1110, the top value the top value (least of all stacks) is removed from the first (lowest) stack such that a new head value is found. At 1115, if the removed top value is not the same as the last output item, then at 1120, the removed value is outputted. Otherwise, at 1125, the stack is reinserted into the sorted stack list by a new head value. At 1130, if the stack is empty, then it need not be reinserted and the process returns to step 1110. When all stacks are empty, then the process is complete.

It should be appreciated that in certain embodiments, each item in each list is visited once, but the visit involves inserting the stack the item came from back into the sorted list of stacks. Given/stacks with a total of n items, and a stack insertion time of $\log_2(l)$, this process has an average time complexity of $O(n \log_2(l))$.

This union will produce a final, sorted list of offsets into the flow index. Retrieving the flow records in these embodiments is a process of jumping through these offsets in order and extracting the appropriate records. As flow records are extracted, the flow records can be checked to ensure they match other criteria such as the precise time range specified by the user.

Producing Flow Results

While the above process produces a list of flow records from the index for a single FCAP file, it should be appreciated that for any given search, there are many FCAP files from which the flow records should be combined. The first case of this is when the user specified timespan contains multiple FCAP files. Also, records may need to be merged when combining results from multiple capture interfaces. Further, flow records are combined from other capture nodes. The primary goal of this recombination is the merging of duplicate records. Packets from a flow may exist in multiple time slices and on multiple capture nodes. The merging of flow records allows the system to report correct flow sizes and time periods.

The algorithm for merging the presorted (by flow) stacks of flow records is almost identical to the union (OR) operation described above. The primary difference is that instead of simply outputting the first instance of an item, the item may be merged into any duplicates that follow.

The final result of all these merges should be a list of flows in flow order, just as in all prior steps. Because the user may want the results ordered by time or other criteria, such as flow size or individual attributes of the flow (i.e. source IP, etc.), the search interface may perform a final sort of the results.

Figure 12:
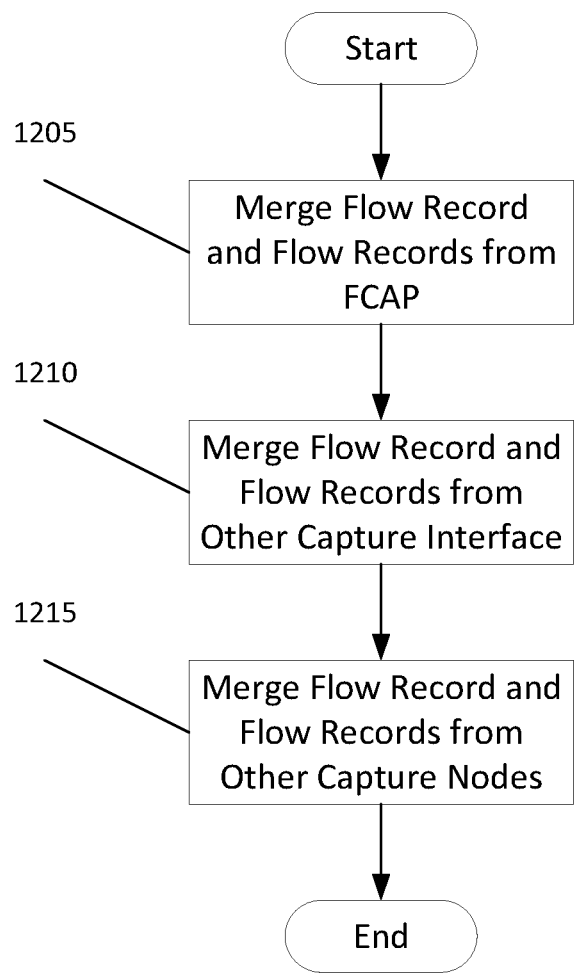
FIG. 12 is a flow diagram illustrating a process for combining flow records, according to an embodiment of the present invention.

FIG. 12 is a flow diagram 1200 illustrating a process for combining flow records, according to an embodiment of the present invention. The process begins at 1205 with merging flow records and flow records from other FCAP file flow indexes. At 1210, the merged flow records are merged with flow records from other capture interfaces, and at 1215, are merged again with flow records from other capture nodes.

Producing PCAP Results

Figure 13:
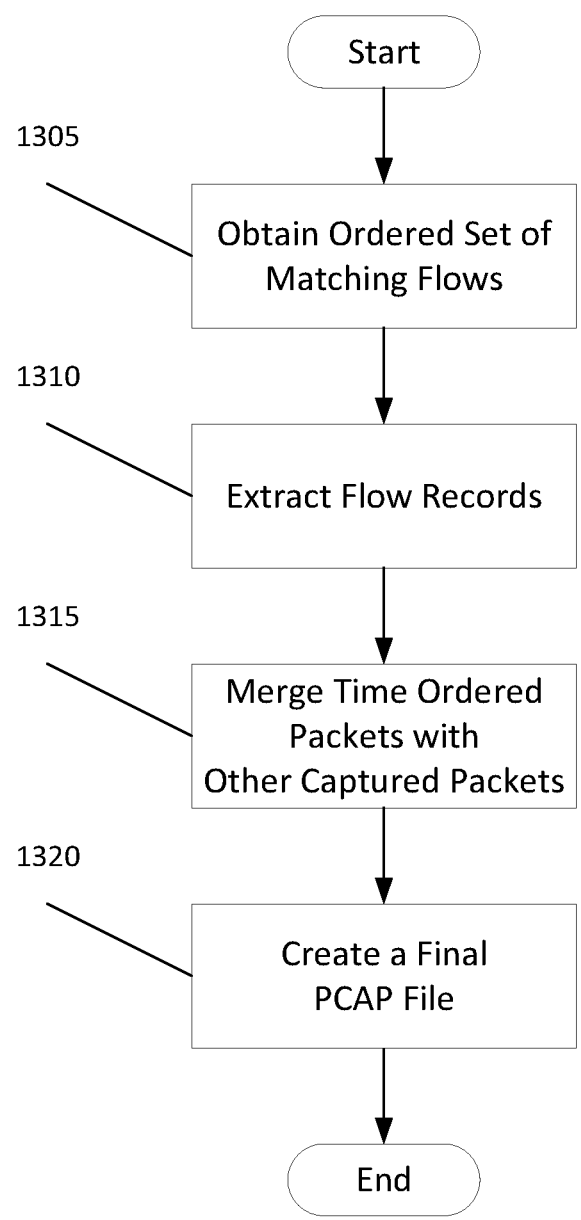
FIG. 13 is a flow diagram illustrating a process for extracting and combining packets from FCAP files, according to an embodiment of the present invention.

If the user requests PCAP rather than flows, a different process may be implemented. FIG. 13 is a flow diagram 1300 illustrating a process for extracting and combining packets from PCAP files, according to an embodiment of the present invention.

The process begins at 1305 with obtaining an ordered set of matching flows from a flow index as described for flow searches above. Each flow record may include the offset to flow packets, which can be directly extracted at 1310 from the FCAP file in a single contiguous disk read. At 1315, the flow packets are stack merged by timestamp, which will implicitly reorder them by timestamp. The stack merge process is almost identical to the OR (union) operation, except that all packets are considered unique and none will be discarded. At 1325, a final PCAP file is created.

The results from each FCAP file may be combined with those from other time-slices, interfaces, and capture nodes. This is yet another merge of pre-sorted data, though in this case, it is already sorted by time rather than flow.

Figure 14:
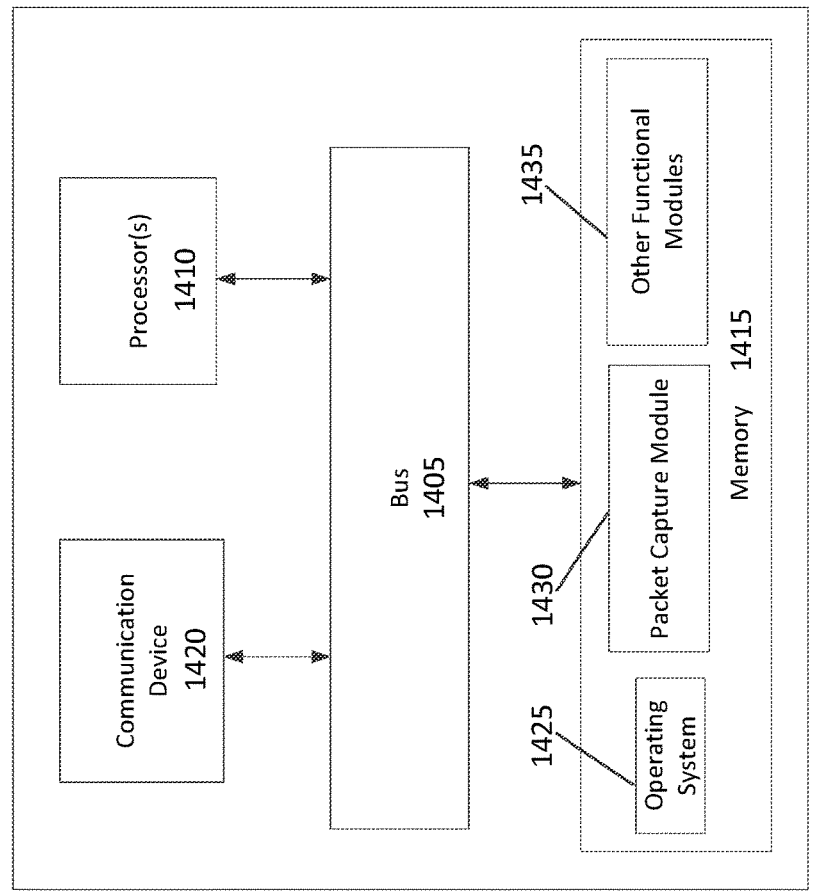
FIG. 14 is a block diagram illustrating a computing system for capturing packets, according to an embodiment of the present invention.

FIG. 14 is a block diagram illustrating a computing system 1400 for packet capture using flows, according to one embodiment of the present invention. Computing system 1400 may include a bus 1405 or other communication mechanism configured to communicate information, and at least one processor 1410, coupled to bus 1405, configured to process information. At least one processor 1410 can be any type of general or specific purpose processor. Computing system 1400 may also include memory 1420 configured to store information and instructions to be executed by at least one processor 1410. Memory 1420 can be comprised of any combination of random access memory ("RAM"), read only memory ("ROM"), static storage such as a magnetic or optical disk, or any other type of computer readable medium. Computing system 1400 may also include a communication device 1415, such as a network interface card, configured to provide access to a network.

The computer readable medium may be any available media that can be accessed by at least one processor 1410. The computer readable medium may include both volatile and nonvolatile medium, removable and non-removable media, and communication media. The communication media may include computer readable instructions, data structures, program modules, or other data and may include any information delivery media.

At least one processor 1410 can also be coupled via bus 1405 to a display 1440, such as a Liquid Crystal Display ("LCD"). Display 1440 may display information to the user, such as flow records. A keyboard 1445 and a cursor control unit 1450, such as a computer mouse, may also be coupled to bus 1405 to enable the user to interface with computing system 1400.

According to one embodiment, memory 1420 may store software modules that may provide functionality when executed by at least one processor 1410. The modules can include an operating system 1425 and a packet capture module 1430, as well as other functional modules 1435. Operating system 1425 may provide operating system functionality for computing system 100. Because computing system 1400 may be part of a larger system, computing system 1400 may include one or more additional functional modules 1435 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Capturing packets and pre-organizing by flow allows for new optimizations in the packet capture process, and greatly improves the user experience. For example, certain embodiments of the present invention pertain to a distributed database system that searches and extras flows from captured network traffic. In some embodiments, the captured network traffic is pre-organized for efficient extraction and search before the captured network traffic is written to disk. Indexes may allow for flow extraction without wasting disk I/O, greatly enhancing extraction speeds. In some embodiments, the indexes may be less than 1 percent of the size of the captured network traffic.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented process for organizing packets by network flows, comprising:
    copying packets from a network interface and into a bucket;
    when the bucket is full, indexing the packets within the full bucket by network flow and creating a new bucket to retrieve additional packets from the network interface into the new bucket,
    wherein the indexing of the packets within the full bucket comprises searching for a corresponding flow within a flow index for each packet within the full bucket, and adding each packet to the corresponding flow such that the packets are sorted into flows;
    creating a flow capture (FCAP) file in memory prior to writing the packets to the FCAP file, wherein
    the creating of the FCAP file comprises transmitting a request to a computing system for creating space in the memory for the FCAP file; and
    writing the packets to the FCAP file reducing amount of disk input/output (I/O) required to retrieve the packets,
    wherein the writing of the packets to the FCAP file comprises organizing the packets within the FCAP by the network flow and in original time order in which the packets are received for the full bucket that is indexed; and
    writing indexes of the FCAP file to the memory.

2. The computer-implemented process of claim 1, wherein the indexing of the bucket comprises sub-indexing each network flow by individual components of 5-tuple.

3. The computer-implemented process of claim 2, wherein the individual components of 5-tuple comprise source Internet Protocol (IP), destination IP, source port, destination port, and a transport protocol.

4. The computer-implemented process of claim 1, wherein the indexing of the bucket comprises searching for the corresponding network flow in the flow index for each packet in the bucket.

5. The computer implemented process of claim 4, wherein the indexing of the bucket comprises adding a packet to the corresponding network flow.

6. The computer implemented process of claim 4, wherein the indexing of the bucket comprises creating a new network flow when the corresponding network flow is nonexistent and adding the new network flow to a sub-index flow.

7. The computer-implemented process of claim 1, further comprising: creating the FCAP file in the memory prior to writing the packets to the FCAP file.

8. The computer-implemented process of claim 7, wherein the creating of the FCAP file comprises transmitting a request to a computing system for creating space in the memory for the FCAP file.

9. The computer-implemented process of claim 8, wherein the creating of the FCAP file comprises recording the flow index when the space for the FCAP file is created.

10. The computer-implemented process of claim 9, wherein the creating of the FCAP file comprises creating an index file for each sub-index within the flow index.

11. The computer-implemented process of claim 1, wherein the writing the packets to the FCAP file further comprises writing the packets to the FCAP file based on the sort order determined during the indexing of the packets.

12. A computer-implemented process, comprising:
    retrieving packets from a network interface and storing the packets within a bucket;
    when the bucket is full, starting a new bucket to retrieve additional packets from the network interface; and
    indexing the packets within the full bucket, wherein the indexing of the full bucket comprises sorting the packets within the full bucket by a network flow, the sorting of the packets within the full bucket comprises
    searching for a corresponding flow within a flow index for each packet within the full bucket, and-adding
    each packet to the corresponding flow such that the packets are sorted into flows;
    creating a flow capture (FCAP) file in memory prior to writing the packets to the FCAP file, wherein
    the creating of the FCAP file comprises transmitting a request to a computing system for creating space in the memory for the FCAP file; and
    writing the packets to the FCAP file reducing amount of disk input/output (I/O) required to retrieve the packets, wherein the writing of the packets to the FCAP file comprises organizing the packets within the FCAP by the network flow and in original time order in which the packets are received for the full bucket that is indexed; and
    writing indexes of the FCAP file to memory.

13. The computer-implemented process of claim 12, wherein the indexing of the full bucket comprises searching for the corresponding network flow in the flow index for each packet in the full bucket.

14. The computer implemented process of claim 13, wherein the indexing of the full bucket comprises adding a packet to the corresponding network flow.

15. The computer implemented process of claim 14 wherein the indexing of the full bucket comprises creating a new network flow when the corresponding network flow does not exist and adding the new network flow to a sub-index flow.

16. The computer-implemented process of claim 12, further comprising:
    creating the FCAP file in the memory prior to writing the packets to the FCAP file.

17. The computer-implemented process of claim 12, wherein the writing of the packets to the FCAP file further comprises writing the packets to the FCAP file based on the sort order determined during the indexing of the full bucket.

18. A computer-implemented process for organizing packets by network flows, comprising:
    copying packets from a network interface and into a bucket;
    when the bucket is full, indexing the packets within the full bucket by network flow and creating a new bucket to retrieve additional packets from the network interface into the new bucket, wherein the indexing of the packets within the full bucket comprises searching for a corresponding flow within a flow index for each packet within the full bucket, and adding each packet to the corresponding flow such that the packets are sorted into flows;

creating a flow capture (FCAP) file in memory prior to writing the packets to the FCAP file, wherein the creating of the FCAP file comprises transmitting a request to a computing system for creating space in the memory for the FCAP file; and writing of the packets to the FCAP file reducing amount of disk input/output (I/O) required to retrieve the packets, wherein the writing of the packets to the FCAP file comprises organizing the packets within the FCAP by the network flow and in original time order in which the packets are received for the full bucket that is indexed; and writing indexes of the FCAP file to the memory.

* * * * *